United States Patent
Jeong et al.

(10) Patent No.: US 9,110,896 B2
(45) Date of Patent: Aug. 18, 2015

(54) ACTIVE AIR FLAP APPARATUS FOR VEHICLE AND DEFECT DIAGNOSIS METHOD THEREOF

(71) Applicants: Hyundai Motor Company, Seoul (KR); Kia Motors Corp., Seoul (KR); HYUNDAI MOBIS CO., LTD., Seoul (KR)

(72) Inventors: Phil Jung Jeong, Yongin-si (KR); In Cheol Kim, Yongin-si (KR); Yong Jin Jung, Seongnam-si (KR); Sang Won Park, Suwon-si (KR)

(73) Assignees: HYUNDAI MOTOR COMPANY, Seoul (KR); KIA MOTORS CORP., Seoul (KR); HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 13/946,504

(22) Filed: Jul. 19, 2013

(65) Prior Publication Data
US 2014/0129078 A1 May 8, 2014

(30) Foreign Application Priority Data
Nov. 5, 2012 (KR) .................. 10-2012-0124047

(51) Int. Cl.
*G06F 11/30* (2006.01)
*B60K 11/08* (2006.01)
*F01P 7/02* (2006.01)

(52) U.S. Cl.
CPC ............... *G06F 11/30* (2013.01); *B60K 11/085* (2013.01); *F01P 7/02* (2013.01)

(58) Field of Classification Search
CPC ............ B60K 11/085; F01P 7/02; G06F 7/00
USPC ............. 701/22, 36, 32.8; 340/449; 180/68.1; 123/41.04, 41.1, 41.15
See application file for complete search history.

(56) References Cited

U.S. PATENT DOCUMENTS

| | | | |
|---|---|---|---|
| 4,779,577 A | 10/1988 | Ritter et al. | |
| 7,727,058 B2 * | 6/2010 | Heilemann et al. | 454/143 |
| 7,766,111 B2 * | 8/2010 | Guilfoyle et al. | 180/68.1 |
| 7,975,637 B1 * | 7/2011 | Nida | 114/211 |

(Continued)

FOREIGN PATENT DOCUMENTS

| | | |
|---|---|---|
| JP | 2010-247819 A | 11/2010 |
| JP | 2012-197001 A | 10/2012 |

(Continued)

*Primary Examiner* — Thomas G Black
*Assistant Examiner* — Wae Louie
(74) *Attorney, Agent, or Firm* — Morgan, Lewis & Bockius LLP

(57) ABSTRACT

An active air flap apparatus for a vehicle may include a drive flap positional sensor connected with a drive shaft connecting an actuator and a drive flap and detecting a rotational angle of the drive flap, a driven flap pivotally connected with the drive flap through a link mechanism, a driven flap positional sensor connected with a driven shaft pivotally connected with the link member and detecting a rotational angle of the driven flap, and a controller determining whether the drive flap positional sensor, the driven flap positional sensor, a motor of the actuator, and the link member may be defective by monitoring a feedback voltage value of the drive flap positional sensor, a feedback voltage value of the driven flap positional sensor, and a current applied to the motor of the actuator.

11 Claims, 5 Drawing Sheets

(56) References Cited

U.S. PATENT DOCUMENTS

| | | | |
|---|---|---|---|
| 8,118,124 B2* | 2/2012 | Shin et al. | 180/68.1 |
| 8,161,919 B2* | 4/2012 | Klotz et al. | 123/41.04 |
| 8,292,014 B2* | 10/2012 | Sugiyama | 180/68.1 |
| 8,302,715 B2* | 11/2012 | Lee et al. | 180/68.1 |
| 8,655,545 B2* | 2/2014 | Yu et al. | 701/36 |
| 8,683,854 B2* | 4/2014 | Pursifull et al. | 73/114.68 |
| 8,689,617 B2* | 4/2014 | Rollinger et al. | 73/114.68 |
| 8,692,662 B2* | 4/2014 | Shin et al. | 340/449 |
| 8,794,363 B2* | 8/2014 | Wolf | 180/68.1 |
| 2006/0095178 A1* | 5/2006 | Guilfoyle et al. | 701/36 |
| 2011/0307131 A1* | 12/2011 | Norden | 701/22 |
| 2012/0060522 A1* | 3/2012 | Markowitz et al. | 62/79 |
| 2013/0030622 A1* | 1/2013 | Park et al. | 701/22 |
| 2013/0146375 A1* | 6/2013 | Lee | 180/68.1 |
| 2013/0147619 A1* | 6/2013 | Shin et al. | 340/449 |
| 2013/0255599 A1* | 10/2013 | Jentz et al. | 123/41.1 |
| 2013/0255603 A1* | 10/2013 | Pursifull et al. | 123/41.15 |
| 2013/0255604 A1* | 10/2013 | Rollinger et al. | 123/41.15 |
| 2014/0129078 A1* | 5/2014 | Jeong et al. | 701/32.8 |
| 2014/0142819 A1* | 5/2014 | Pursifull et al. | 701/51 |

FOREIGN PATENT DOCUMENTS

| | | |
|---|---|---|
| KR | 10-2011-0031019 A | 3/2011 |
| KR | 10-2011-0080037 A | 7/2011 |
| KR | 10-2011-0132924 A | 12/2011 |
| KR | 10-2012-0037769 A | 4/2012 |
| KR | 10-2012-0050871 A | 5/2012 |

* cited by examiner

ACTIVE AIR FLAP APPARATUS FOR VEHICLE AND DEFECT DIAGNOSIS METHOD THEREOF

CROSS-REFERENCE TO RELATED APPLICATION

The present application claims priority to Korean Patent Application No. 10-2012-0124047 filed on Nov. 5, 2012, the entire contents of which is incorporated herein for all purposes by this reference.

BACKGROUND OF THE INVENTION

1. Field of the Invention

The present invention relates to an active air flap apparatus for a vehicle and a defect diagnosis method thereof, and more particularly, to a technology associated with an active air flap apparatus for a vehicle configured to respectively separate and diagnose a defect caused by a sensor and a defect caused by a mechanical connection mechanism.

2. Description of Related Art

FIGS. 1 and 2 illustrate one example of an active air flap apparatus for a vehicle in the related art. Therefore, the active air flap apparatus includes a duct housing 1 installed with being coupled to a front end module of the vehicle, an actuator 2 fixedly installed in the duct housing 1, a drive flap 4 directly connected with the actuator 2 through a drive shaft 3 and rotatably installed in the duct housing 1, and a driven flap 6 connected with the drive flap 4 through a link mechanism 5 and rotatably installed in the duct housing 1.

The actuator 2 includes a PCB 2a, a motor 2b, and a plurality of gear members 2c and is a structure in which one end of the drive shaft 3 is coupled to a final output gear 2d among the gear members 2c and further, a drive flap positional sensor 7 detecting a rotational angle of the drive flap 4 is mounted on the output gear 2d.

Herein, as the drive flap positional sensor 7, a potentiometer may be used, but the drive flap positional sensor 7 is not limited thereto.

Accordingly, when the actuator 2 operates, power is transmitted through the drive shaft 3, and as a result the drive flap 4 rotates and rotational force of the drive flap 4 is transmitted to the driven flap 6 through the link mechanism 5, and as a result, the driven flap rotates together.

However, it is possible to verify the position of the drive flap 4 through the drive flap positional sensor 7, but it is impossible to verify the position of the rest of the driven flap 6 connected through the link mechanism 5, and as a result, when an error (a defect and a damage) occurs in the link mechanism 5, a state at that time cannot be diagnosed.

Further, the apparatus in the related art has only one sensor and does not have a diagnosis method for the defect of the sensor (drive flap positional sensor) itself and in particular, when the sensor is out of order, the air flap is misoperated by using a sensor value which is out of order.

In addition, the apparatus in the related art performs misdiagnosis due to a system defect even in a situation in which the flaps 4 and 6 are fixed by freezing or foreign materials.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an active air flap apparatus for a vehicle and a defect diagnosis method thereof that can secure reliability for a product and improve productivity therethrough by diagnosing a defect for a sensor itself and diagnosing an error state by a link mechanism through comparison of two sensor values connected with a drive flap and a driven flap and preventing misdiagnosis due to a system defect when air flaps are fixed by freezing or foreign materials.

In an aspect of the present invention, an active air flap apparatus for a vehicle may include a drive flap positional sensor connected with a drive shaft connecting an actuator and a drive flap and detecting a rotational angle of the drive flap, a driven flap pivotally connected with the drive flap through a link mechanism, a driven flap positional sensor connected with a driven shaft pivotally connected with the link member and detecting a rotational angle of the driven flap, and a controller determining whether the drive flap positional sensor, the driven flap positional sensor, a motor of the actuator, and the link member are defective by monitoring a feedback voltage value of the drive flap positional sensor, a feedback voltage value of the driven flap positional sensor, and a current applied to the motor of the actuator.

The drive flap positional sensor and the driven flap positional sensor are provided in the actuator as a potentiometer that is input into the controller by detecting the rotational angles of the drive shaft and the driven shaft, respectively.

In another aspect of the present invention, a defect diagnosis method of an active air flap apparatus for a vehicle may include a sensor defect determining step of determining whether a drive flap positional sensor and a driven flap positional sensor are defective by using feedback voltage values of the drive flap positional sensor and the driven flap positional sensor, a link mechanism defect determining step of determining whether a link mechanism is erroneous by using the feedback voltage values of the drive flap positional sensor and the driven flap positional sensor when the drive flap positional sensor and the driven flap positional sensor are in a normal state and a drive flap operates normally, and a motor defect determining step of determining whether a motor is defective by monitoring a current value applied to the motor of an actuator when the drive flap positional sensor and the driven flap positional sensor are in the normal state and the drive flap operates abnormally.

In the sensor defect determining step, when the feedback voltage value of the drive flap positional sensor and the feedback voltage value of the driven flap positional sensor are present in a normal range, respectively and a difference between the feedback voltage value of the drive flap positional sensor and the feedback voltage value of the driven flap positional sensor is present in the normal range, it is determined that the sensor is in the normal state, wherein in the sensor defect determining step, when the feedback voltage value of the drive flap positional sensor and the feedback voltage value of the driven flap positional sensor are not present in the normal range, respectively or the difference between the feedback voltage value of the drive flap positional sensor and the feedback voltage value of the driven flap positional sensor are not present in the normal range, it is determined that the sensor is defective.

In the link mechanism defect determining step, in the case where the respective feedback voltage values are present within the normal range when the drive flap is opened and closed, it is determined that the drive flap operates normally.

In the link mechanism defect determining step, in the case where the difference between the feedback voltage value of the drive flap positional sensor and the feedback voltage value of the driven flap positional sensor are not present within the normal range, it is determined that an error state in which the link mechanism falls out and is damaged occurs.

In the motor defect determining step, when operating current applied to the motor is not detected, it is determined that the motor is defective.

In the motor defect determining step, when operating current applied to the motor is detected, it is determined that the drive flap or the driven flap is frozen or fixed by foreign materials, wherein when the drive flap positional sensor and the driven flap positional sensor are defective, the link mechanism is erroneous, or the motor is defective, a warning lamp is turned on, and when the drive flap and the driven flap are fixed by freezing or the foreign materials, the warning lamp is not turned on.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
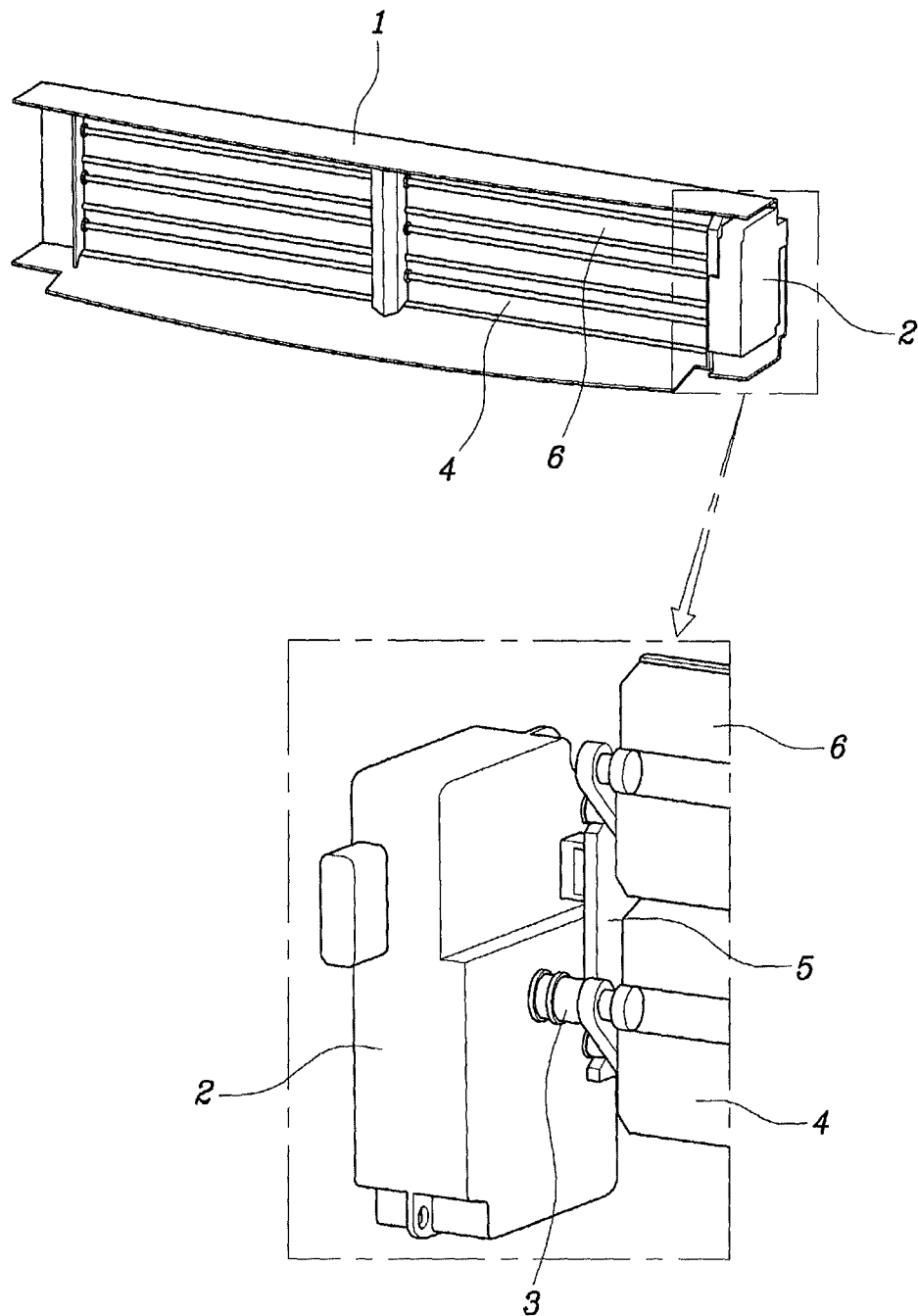
FIG. 1 is a diagram for describing an active air flap apparatus in the related art.
Figure 2:
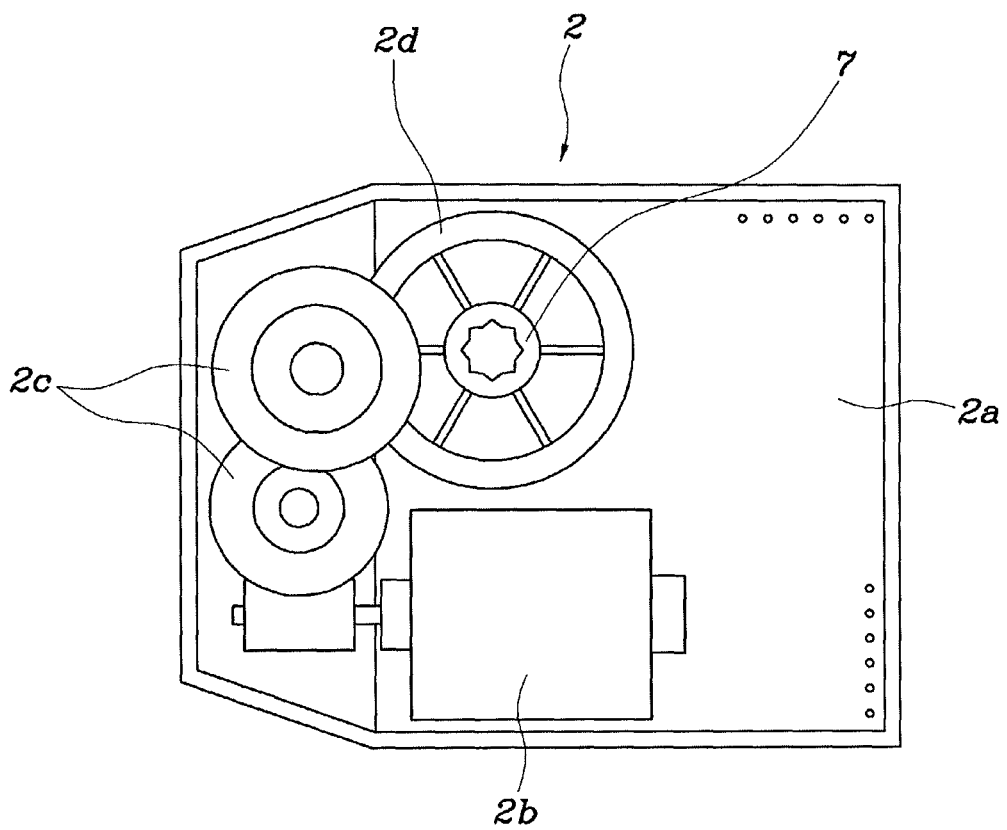
FIG. 2 is a diagram of an actuator in the related art.
Figure 3:
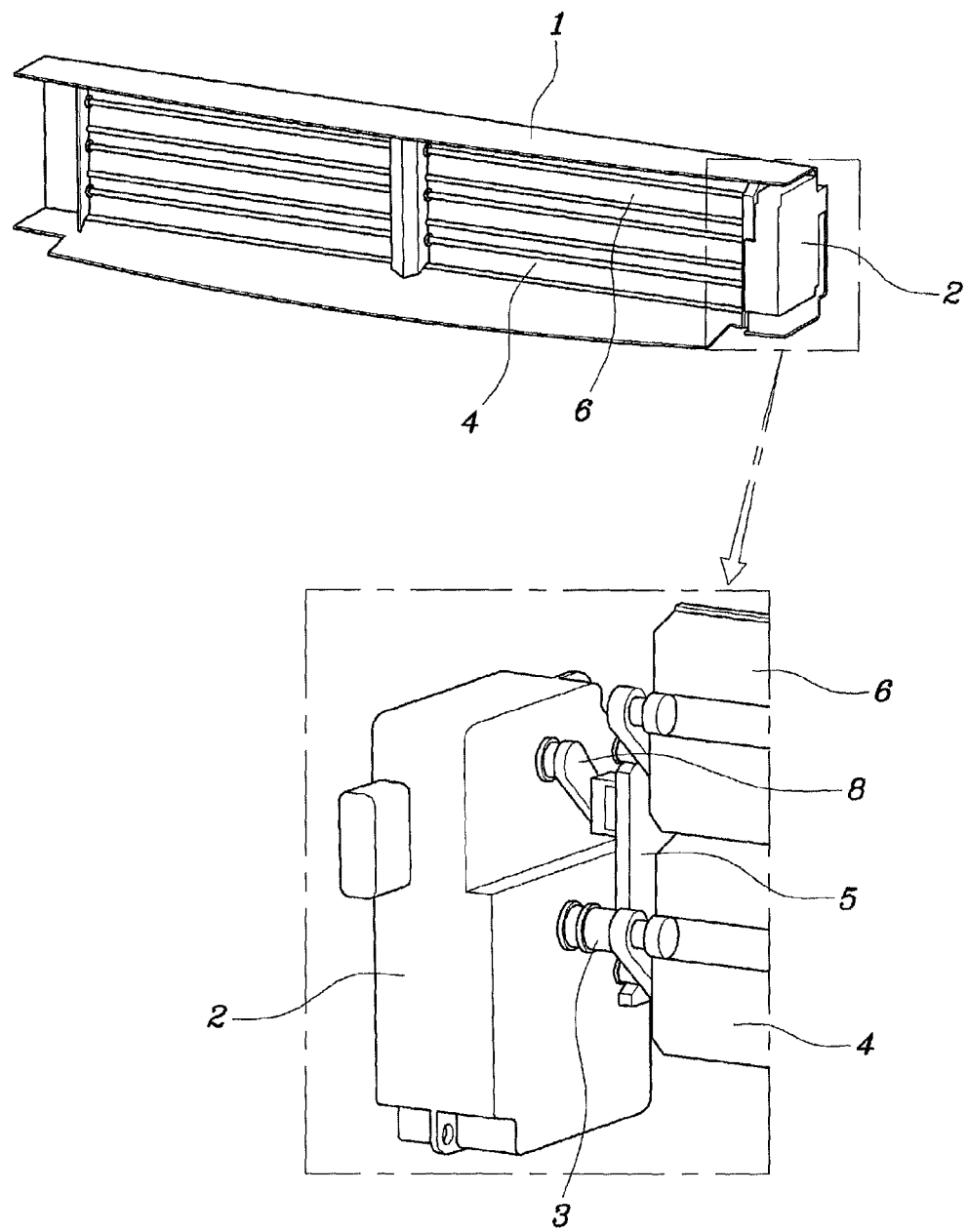
FIG. 3 is a diagram for describing an active air flap apparatus according to an exemplary embodiment of the present invention.
Figure 4:
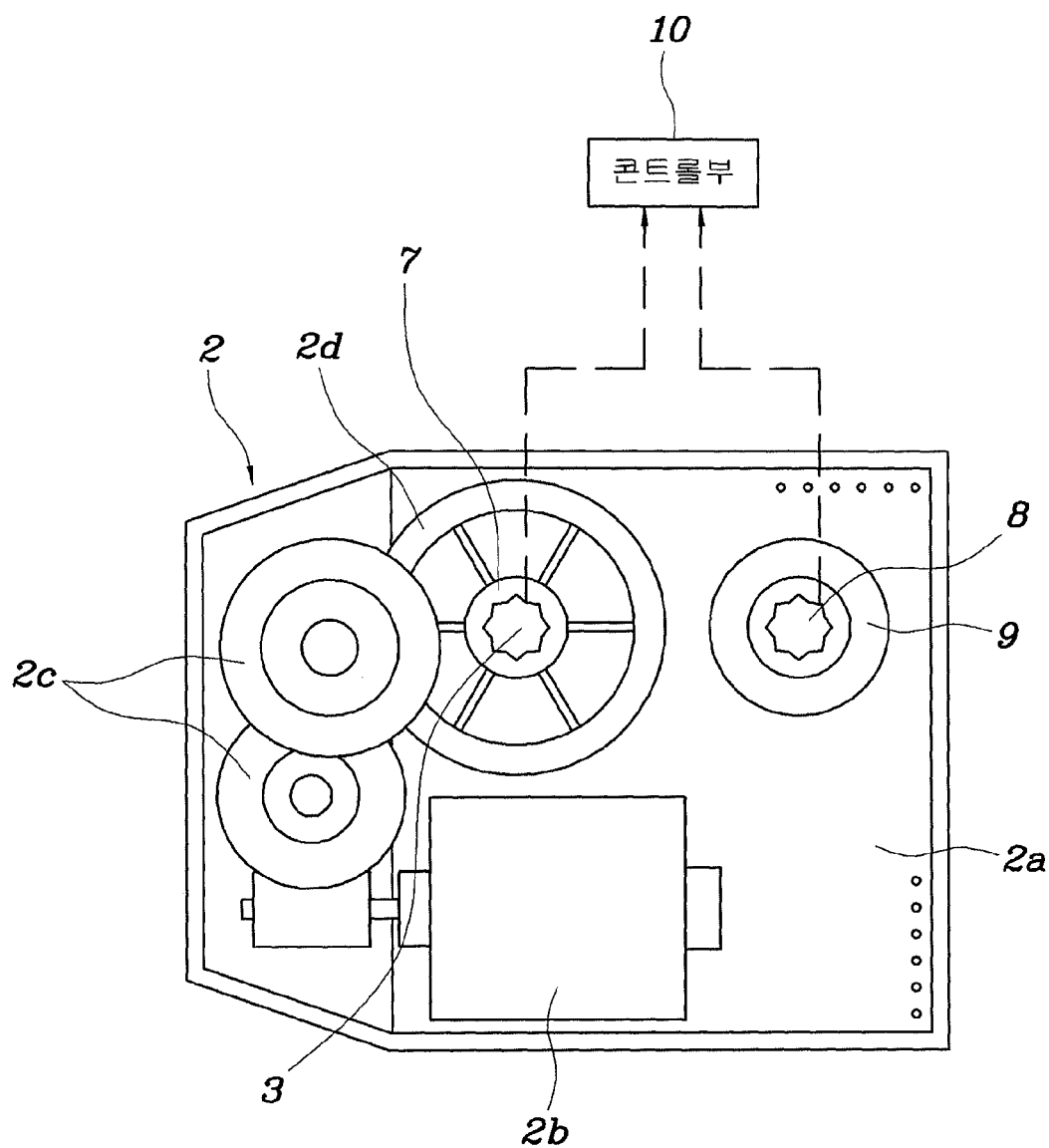
FIG. 4 is a diagram of an actuator of FIG. 3.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an active air flap apparatus for a vehicle and a defect diagnosis method thereof according to exemplary embodiments of the present invention will be described with reference to the accompanying drawings.

The active air flap apparatus for a vehicle according to an exemplary embodiment of the present invention includes a duct housing 1 installed with being coupled to a front end module of the vehicle, an actuator fixedly installed in the duct housing 1, a drive flap 4 directly connected with the actuator 2 through a drive shaft 3 and rotatably installed in the duct housing 1, a driven flap 6 connected with the drive flap 4 through a link mechanism 5 and rotatably installed in the duct housing 1, a drive flap positional sensor 7 installed to be connected with the drive shaft 3 to detect a rotational angle of the drive flap 4, a driven shaft 8 connected with the link member 5, a driven flap positional sensor 9 installed to be connected with the driven shaft 8 to detect a rotational angle of the driven flap 6, and a controller 10 determining whether the drive flap positional sensor 7 and the driven flap positional sensor 9 and a motor 2b and the link member 5 are defective by monitoring a feedback voltage value of the drive flap positional sensor 7 and a feedback voltage value of the driven flap positional sensor 9 and a current applied to the motor 2b of the actuator 2.

The actuator 2 includes a PCB 2a, a motor 2b, and a plurality of gear members 2c and is a structure in which one end of the drive shaft 3 is coupled to a final output gear 2d among the gear members 2c and further, a drive flap positional sensor 7 detecting a rotational angle of the drive flap 4 is mounted on the output gear 2d.

Herein, the drive flap positional sensor 7 and the driven flap positional sensor 9 are provided in the actuator 2 as a potentiometer that is input into the controller 10 by detecting the rotational angles of the drive shaft 3 and the driven shaft 8, respectively.

Figure 5:
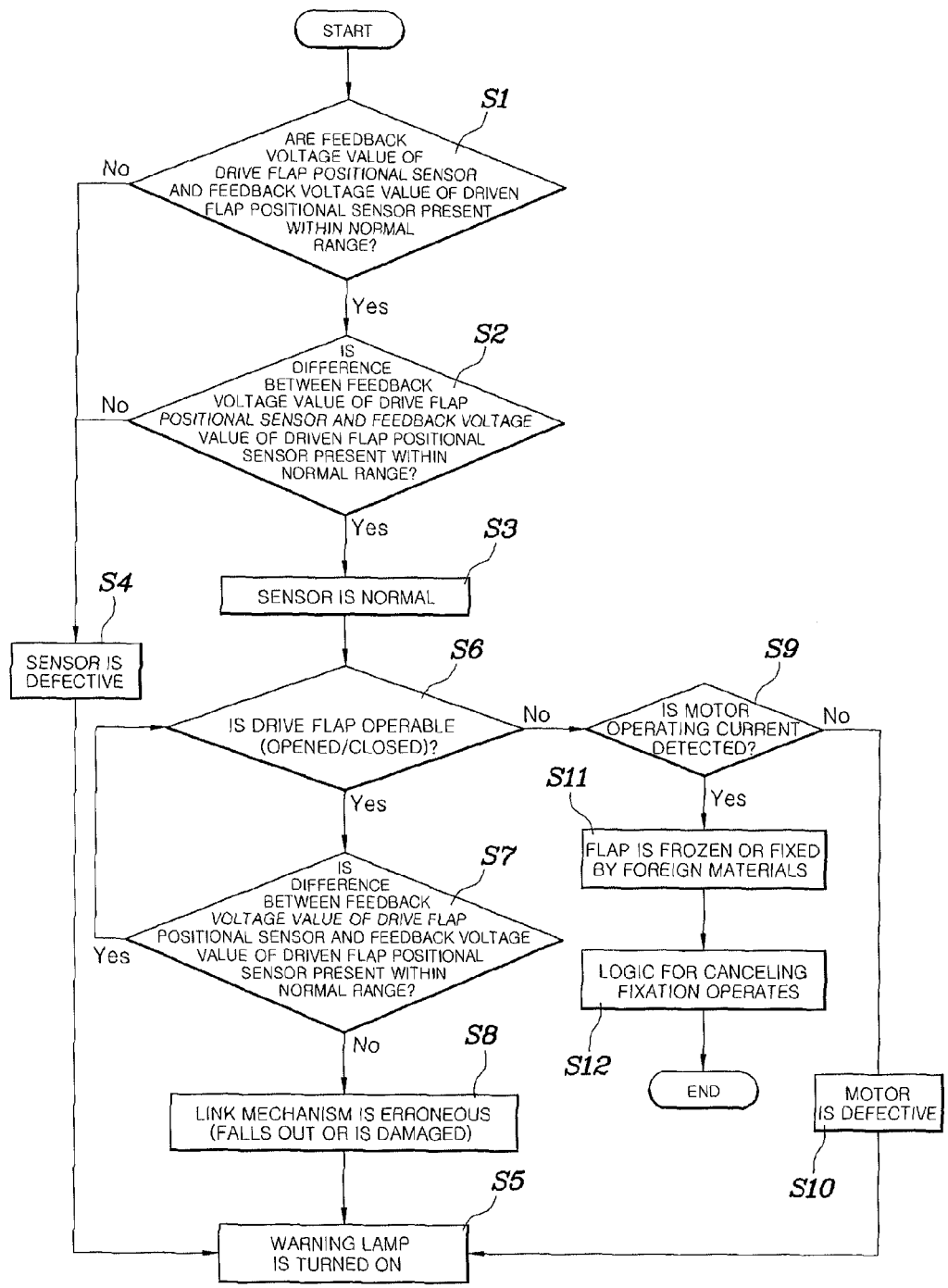
FIG. 5 is a flowchart for describing a defect diagnosis method of an active air flap for a vehicle according to an exemplary embodiment of the present invention.

In addition, a defect diagnosis method of an active air flap apparatus for a vehicle according to an exemplary embodiment of the present invention will be described with reference to FIG. 5.

That is, the defect diagnosis method of the active air flap apparatus for a vehicle according to an exemplary embodiment of the present invention includes: a sensor defect determining step of determining whether a drive flap positional sensor 7 and a driven flap positional sensor 9 are defective by using feedback voltage values of the drive flap positional sensor 7 and the driven flap positional sensor 9, a link mechanism defect determining step of determining whether a link mechanism 5 is erroneous by using the feedback voltage values of the drive flap positional sensor 7 and the driven flap positional sensor 9 when the drive flap positional sensor 7 and the driven flap positional sensor 9 are in a normal state and a drive flap 6 operates normally, and a motor defect determining step of determining whether a motor 2b is defective by monitoring a current value applied to the motor 2b of an actuator 2 when the drive flap positional sensor 7 and the driven flap positional sensor 9 are in the normal state and a drive flap 4 operates abnormally.

In the sensor defect determining step, when the feedback voltage value of the drive flap positional sensor 7 and the feedback voltage value of the driven flap positional sensor 9 are present in a normal range, respectively and a difference between the feedback voltage value of the drive flap positional sensor 7 and the feedback voltage value of the driven flap positional sensor 9 is present in the normal range, it is determined that the sensor is in the normal state and when even any one is not satisfied, it is determined that the sensor is defective.

The defect of the sensor itself may be diagnosed by the sensor defect determination and in particular, the active air flap may be prevented from being misoperated due to a defective sensor value by adopting two positional sensors 7 and 9.

In the link mechanism defect determining step, in the case where the respective feedback voltage values are present within the normal range when the drive flap 6 is opened and closed, it is determined that the drive flap 6 operates normally.

In addition, in the link mechanism defect determining step, in the case where the difference between the feedback voltage value of the drive flap positional sensor 7 and the feedback voltage value of the driven flap positional sensor 9 are not present within the normal range, it is determined that an error state in which the link mechanism 5 falls out and is damaged occurs.

In the motor defect determining step, when operating current applied to the motor 2b is not detected, it is determined that the motor is defective and when the operating current applied to the motor 2b is detected, it is determined that the drive flap 4 or the driven flap 6 is frozen or fixed by foreign materials.

In addition, when the sensors 7 and 9 are defective, the link mechanism 5 is erroneous, or the motor 2b is defective, a warning lamp is turned on and when the flaps 4 and 6 are fixed by freezing or foreign materials, the warning lamp is not turned on.

Herein, an operation of the exemplary embodiment of the present invention will be described.

When an ignition switch is turned on, it is determined whether the feedback voltage value of the drive flap positional sensor 7 and the feedback voltage value of the driven flap positional sensor 9 are present within the normal range, respectively (step S1) and further, it is determined whether the difference between the feedback voltage value of the drive flap positional sensor 7 and the feedback voltage value of the driven flap positional sensor 9 is present within the normal range (step S2).

As a result of the determination, when all of the values are present within the normal range, it is determined that the sensors 7 and 9 are in the normal state (step S3) and when even any one is not satisfied, it is determined that the sensor is defective (step S4) and in this case, the warning lamp is turned on (step S5).

In addition, when both the drive flap positional sensor 7 and the driven flap positional sensor 9 are in the normal state, it is determined whether the drive flap 6 operates normally (step S6) and in the case where the respective feedback voltage values are present within the normal range when the drive flap 6 is opened and closed, it is determined that the drive flap 6 operates normally and in the case where the respective feedback voltage values are not present in the normal range, it is determined that the drive flap 6 operates abnormally.

When both the drive flap positional sensor 7 and the driven flap positional sensor 9 are in the normal state and the drive flap 6 operates normally, it is determined whether the difference between the feedback voltage value of the drive flap positional sensor 7 and the feedback voltage value of the driven flap positional sensor 9 are present within the normal range (step S7), and in this case, when the difference is present within the normal range, it is determined that the link mechanism 5 is not erroneous and when the difference is not present within the normal range, it is determined that the link mechanism 5 falls out or is damaged (step S8). Even in this case, the warning lamp is turned on.

When the drive flap positional sensor 7 and the driven flap positional sensor 9 are in the normal state and the drive flap 4 operates abnormally, the operating current applied to the motor 2b is detected (step S9), and in this case, when the operating current applied to the motor 2b is not detected, it is determined that the motor is defective (step S10), and thereafter, the warning lamp is turned on and when the operating current applied to the motor 2b is detected, it is determined that the motor is not defective but the drive flap 4 or the driven flap 6 is frozen or fixed by foreign materials (step S11).

When it is determined that the flaps 4 and 6 are frozen or fixed by the foreign materials, a logic for canceling the fixation is operated (step S12), and in this case, the warning is not turned on because the sensor and the link mechanism are not defective.

As described above, according to an exemplary embodiment of the present invention, as the defective of the sensor itself may be diagnosed by using the values of two positional sensors 7 and 9 connected to the driven flap 4 and the driven flap 6 and the error state by the link mechanism 5 may be diagnosed, an accurate defect of the active air flap apparatus may be diagnosed.

Further, the defect state of the motor may be determined by monitoring the current value applied to the motor 2b of the actuator 2 and in particular, when the flaps 4 and 6 are frozen or fixed by the foreign materials, it is possible to prevent misdiagnosis that a system is defective, and as a result, reliability of a product can be secured and productivity can be improved therethrough.

According to an active air flap apparatus for a vehicle and a defect diagnosis method thereof, as a defect for a sensor itself can be diagnosed and an error state by a link mechanism can be diagnosed through comparison of two sensor positional sensor values, an accurate defect of the active air flap apparatus can be diagnosed and a defect state can be determined by monitoring a current value applied to a motor of an actuator and in particular, when flaps are fixed by freezing or foreign materials, misdiagnosis by a system defect can be prevented, and as a result, reliability for a product can be secured and productivity can be improved therethrough.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An active air flap apparatus for a vehicle, comprising:
   a drive flap positional sensor connected with a drive shaft connecting an actuator and a drive flap and detecting a rotational angle of the drive flap;
   a driven flap pivotally connected with the drive flap through a link mechanism;

a driven flap positional sensor connected with a driven shaft pivotally connected with the link mechanism and detecting a rotational angle of the driven flap; and a controller determining whether the drive flap positional sensor, the driven flap positional sensor, a motor of the actuator, and the link mechanism are defective by monitoring a feedback voltage value of the drive flap positional sensor, a feedback voltage value of the driven flap positional sensor, and a current applied to the motor of the actuator.

2. The active air flap apparatus for the vehicle of claim 1, wherein the drive flap positional sensor and the driven flap positional sensor are provided in the actuator as a potentiometer that is input into the controller by detecting the rotational angles of the drive shaft and the driven shaft, respectively.

3. A defect diagnosis method of an active air flap apparatus for a vehicle, comprising:

a sensor defect determining step of determining whether a drive flap positional sensor and a driven flap positional sensor are defective by using feedback voltage values of the drive flap positional sensor and the driven flap positional sensor;

a link mechanism defect determining step of determining whether a link mechanism is erroneous by using the feedback voltage values of the drive flap positional sensor and the driven flap positional sensor when the drive flap positional sensor and the driven flap positional sensor are in a normal state and a drive flap operates normally; and a motor defect determining step of determining whether a motor is defective by monitoring a current value applied to the motor of an actuator when the drive flap positional sensor and the driven flap positional sensor are in the normal state and the drive flap operates abnormally.

4. The defect diagnosis method of the active air flap apparatus for the vehicle of claim 3, wherein in the sensor defect determining step, when the feedback voltage value of the drive flap positional sensor and the feedback voltage value of the driven flap positional sensor are present in a normal range, respectively and a difference between the feedback voltage value of the drive flap positional sensor and the feedback voltage value of the driven flap positional sensor is present in the normal range, it is determined that the sensor is in the normal state, and wherein in the sensor defect determining step, when the feedback voltage value of the drive flap positional sensor and the feedback voltage value of the driven flap positional sensor are not present in the normal range, respectively or the difference between the feedback voltage value of the drive flap positional sensor and the feedback voltage value of the driven flap positional sensor are not present in the normal range, it is determined that the sensor is defective.

5. The defect diagnosis method of the active air flap apparatus for the vehicle of claim 3, wherein in the link mechanism defect determining step, in the case where the respective feedback voltage values are present within the normal range when the drive flap is opened and closed, it is determined that the drive flap operates normally.

6. The defect diagnosis method of the active air flap apparatus for the vehicle of claim 3, wherein in the link mechanism defect determining step, in the case where the difference between the feedback voltage value of the drive flap positional sensor and the feedback voltage value of the driven flap positional sensor are not present within the normal range, it is determined that an error state in which the link mechanism falls out and is damaged occurs.

7. The defect diagnosis method of the active air flap apparatus for the vehicle of claim 3, wherein in the motor defect determining step, when operating current applied to the motor is not detected, it is determined that the motor is defective.

8. The defect diagnosis method of the active air flap apparatus for the vehicle of claim 3, wherein in the motor defect determining step, when operating current applied to the motor is detected, it is determined that the drive flap or the driven flap is frozen or fixed by foreign materials.

9. The defect diagnosis method of the active air flap apparatus for the vehicle of claim 8, wherein when the drive flap positional sensor and the driven flap positional sensor are defective, the link mechanism is erroneous, or the motor is defective, a warning lamp is turned on, and when the drive flap and the driven flap are fixed by freezing or the foreign materials, the warning lamp is not turned on.

10. The defect diagnosis method of the active air flap apparatus for the vehicle of claim 3, wherein the active air flap apparatus includes:

the drive flap positional sensor connected with a drive shaft connecting the actuator and the drive flap and detecting a rotational angle of the drive flap;

a driven flap pivotally connected with the drive flap through the link mechanism;

the driven flap positional sensor connected with a driven shaft pivotally connected with the link mechanism and detecting a rotational angle of the driven flap; and a controller determining whether the drive flap positional sensor, the driven flap positional sensor, the actuator, and the link mechanism are defective by monitoring a feedback voltage value of the drive flap positional sensor and a feedback voltage value of the driven flap positional sensor and a current applied to the motor of the actuator.

11. The defect diagnosis method of claim 10, wherein the drive flap positional sensor and the driven flap positional sensor are provided in the actuator as a potentiometer that is input into the controller by detecting the rotational angles of the drive shaft and the driven shaft, respectively.

* * * * *